United States Patent [19]

Boese

[11] Patent Number: 4,515,382
[45] Date of Patent: May 7, 1985

[54] OCCUPANT PROPELLED WHEELED DEVICE

[75] Inventor: Harold L. Boese, Galveston, Tex.

[73] Assignee: HKC, Inc., Houston, Tex.

[21] Appl. No.: 462,019

[22] Filed: Jan. 28, 1983

[51] Int. Cl.$^3$ .............................................. B62M 1/08
[52] U.S. Cl. ..................................... 280/221; 74/578; 280/11.115; 280/87.04 B
[58] Field of Search ............ 280/205, 208, 221, 11.115, 280/11.2, 11.21, 11.24, 11.25, 87.04 B; 188/5; 74/578; 192/46

[56] References Cited

U.S. PATENT DOCUMENTS

| | | | |
|---|---|---|---|
| 1,574,517 | 2/1926 | Rohdiek | 280/11.115 |
| 2,165,996 | 7/1939 | Chiles | 280/11.115 |
| 3,035,854 | 5/1962 | Johnston | 280/221 |

Primary Examiner—Joseph F. Peters, Jr.
Assistant Examiner—Michael Mar
Attorney, Agent, or Firm—Harvey B. Jacobson

[57] ABSTRACT

A two wheeled occupant propelled vehicular device having a pair of wheels mounted on the opposite end portions of an elongated axle extending therebetween with the axle including a pair of opposed offset portions or cranks intermediate the ends thereof with each offset portion being provided with a board or pedal structure on which the feet of an occupant are placed so that the occupant or user of the device may balance himself and stand on the boards and by moving his feet in a pedaling action, the axle can be caused to rotate about an axis extending through the aligned end portions on which the wheels are mounted. A ratchet drive connection is provided between each end portion of the axle and the corresponding wheel in order to rotate the wheels with the axle when the axle is rotated in a forward direction but enabling the wheels to rotate in a reverse direction with respect to the axle thereby enabling the direction of movement of the device to be altered by the occupant or user shifting his feet or twisting his body about a vertical axis so that one of the wheels may ratchet rearwardly in relation to the axle when the device is being turned toward a new direction. The one-way ratchet drive connection between the end portions of the axle and the wheel also enables the device to move in one direction under the force of gravity, such as going down hill, without rotation of the axle.

3 Claims, 4 Drawing Figures

OCCUPANT PROPELLED WHEELED DEVICE

BACKGROUND OF THE INVENTION

1. Field of the Invention

The present invention generally relates to an occupant propelled device in the form of a two wheeled vehicular structure with the two wheels being in alignment and interconnected by an axle having a pair of opposed offset portions intermediate a pair of aligned end portions on which the wheels are mounted with the offset portions including foot receiving boards or pedal-like structures rotatably mounted thereon by which an occupant or user may stand on the boards while balancing himself and propel the device by moving his feet and shifting his weight in a rotatable or pedaling action in order to rotate the axle and propel the device along a supported surface while maintaining his balance on the device with the axle being connected to each of the wheels by a one-way ratchet mechanism which will drive the wheels when the axle is rotated in one direction and will rotate in relation to the wheels when the axle is driven in the opposite direction with the wheels conversely being locked to the axle when the wheels are rotated in one direction and being free wheeling when the wheels are rotated in the opposite direction thereby enabling the device to be directionally controlled by the occupant or user and also enabling the device to roll freely down inclines without the axle rotating thereby enabling the device to be used as a coasting device when going down a slope, hill or the like.

2. Description of the Prior Art

Various types of wheeled vehicular structures are known with such structures including various wheel arrangements and various types of pedal drives for driving one or more of the wheels in order to propel the device along a supporting surface. However, none of the previously known devices with which applicant is aware discloses a structure equivalent to this invention.

SUMMARY OF THE INVENTION

An object of the present invention is to provide a wheeled device in the form of a two wheeled vehicular structure in which the two wheels are oriented in parallel, aligned relation and are interconnected by an axle having a pair of oppositely disposed offset portions incorporated therein and aligned end portions on which the wheels are mounted so that rotation of the axle by an occupant or user balancing himself on the offset portions and moving his feet in a pedaling action will propel the device along a supporting surface.

Another object of the invention is to provide a wheeled device in accordance with the preceding object in which each of the offset portions of the axle is provided with a board or pedal-like structure rotatably mounted thereon with each board incuding a generally planar upper surface disposed above the offset portion of the axle to which it is attached for extending substantially completely under the length of the foot or shoe of an occupant or user thereby facilitating the occupant or user maintaining his balance when pedaling the device or when letting it roll by gravity down hill.

A further object of the invention is to provide a wheeled device in accordance with the preceding objects in which the wheels and the end portions of the axle are interconnected by a ratchet mechanism which will drive the wheels when the axle is rotated in one direction and enabling rotation of the axle in relation to the wheels when the axle is driven in the opposite direction thereby providing a one-way driving connection between the axle and wheels and enabling the wheels to rotate freely in the opposite direction in relation to the axle with the rotation of the wheels in relation to the axle being permitted by the ratchet mechanism interconnecting the axle and each of the wheels.

Yet another object of the invention is to provide a wheeled device in accordance with the preceding objects in which the ratchet mechanism includes an axially movable member drivingly connected to the axle through a pin and slot connection and spring biased toward the wheel with the sleeve including an axially facing pawl or tooth having one surface parallel to the axle and another surface inclined in relation thereto with spring biasing of the tooth toward correspondingly shaped ratchet teeth on the wheel providing a one-way drive connection between the wheels and axle and enabling opposite free relative rotation of the axle and wheels.

A still further object of the invention is to provide a wheeled device in accordance with the preceding objects which is simple in construction, low in manufacturing costs, safely usable by various age groups and easy to assemble and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
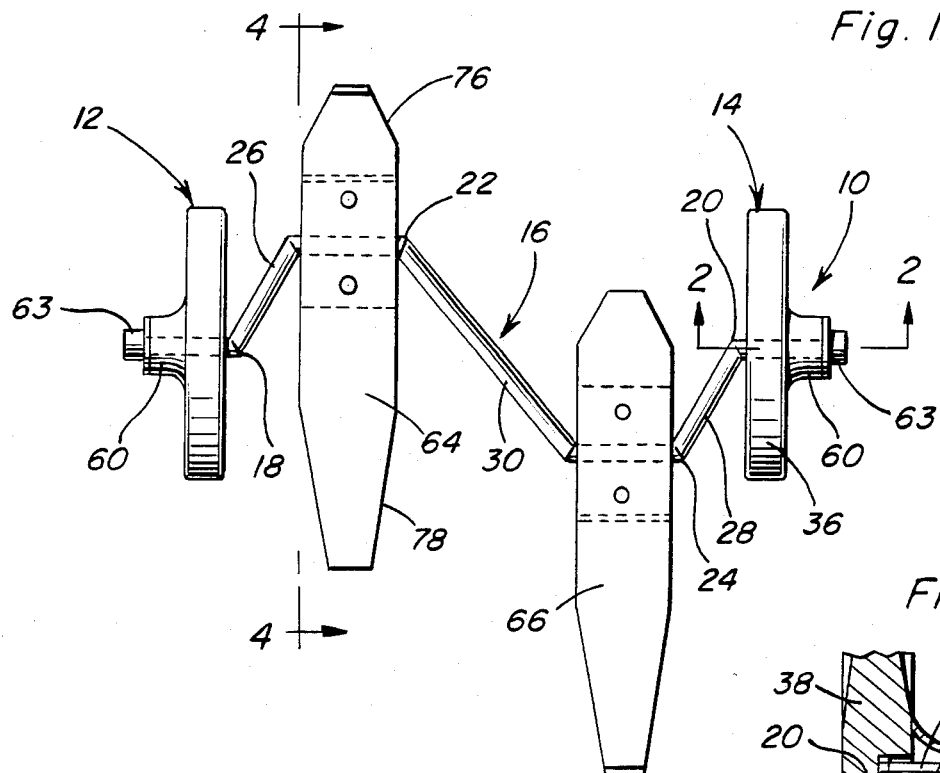
FIG. 1 is a top plan view of the wheeled device of the present invention.
Figure 2:
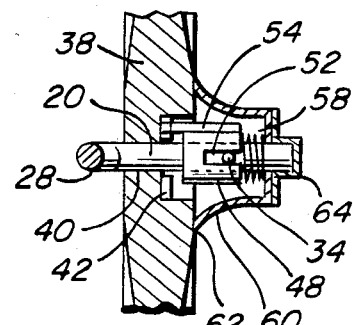
FIG. 2 is a sectional view taken substantially upon a plane passing along section line 2—2 of FIG. 1 illustrating structural details of the ratchet mechanism.
Figure 4:
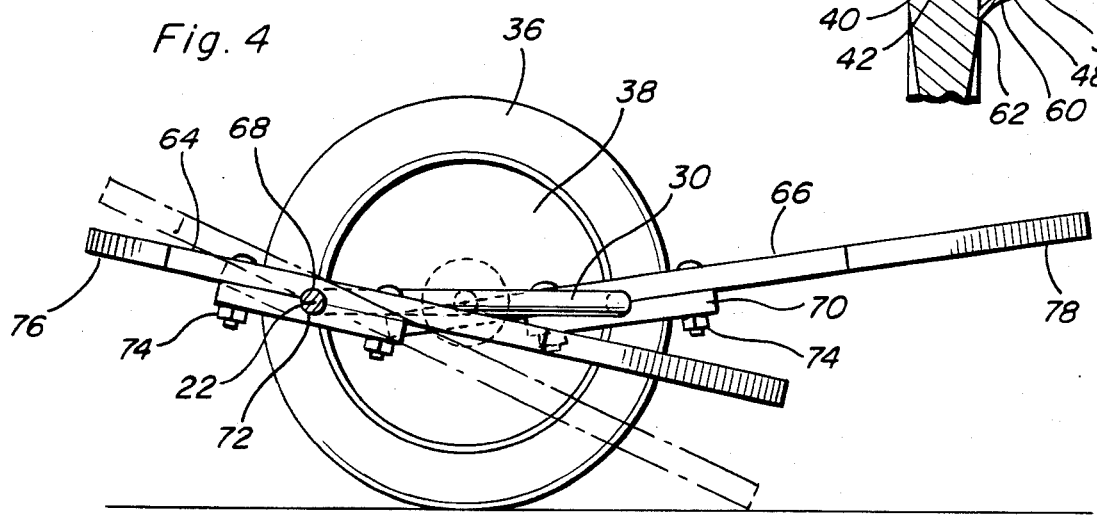
FIG. 4 is a detailed sectional view taken substantially upon a plane passing along section line 4—4 of FIG. 1 illustrating the structural details of one of the offset portions of the axle and the attached board.
Figure 3:
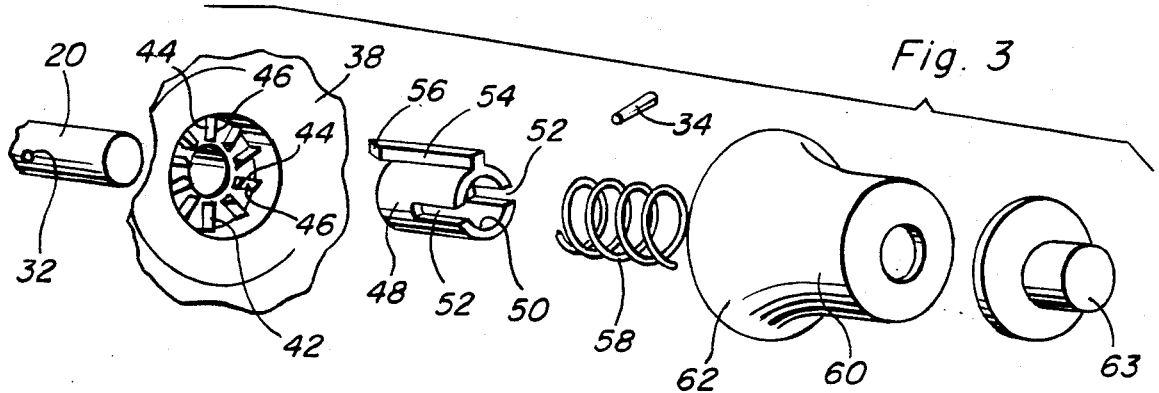
FIG. 3 is a group perspective view illustrating further structural details of the ratchet mechanism.

Referring now specifically to the drawings, the wheeled device of the present invention is generally designated by reference numeral 10 and includes a pair of wheels 12 and 14 which are oriented in spaced, parallel, aligned relationship and which are interconnected by an elongated axle or shaft generally designated by numeral 16. The axle 16 includes a pair of aligned axially extending end portions 18 and 20 on which the wheels 12 and 14 are mounted. Inwardly of the wheels, the axle 16 is provided with a pair of oppositely disposed offset portions 22 and 24 which are in parallel relation to each other and are oriented on opposite sides of the longitudinal axis of the shaft defined by the end portions 18 and 20. The offset portions 22 and 24 are formed by short angulated portions 26 and 28 which extend between the end portion 18 and offset portion 22 and end portion 20 and offset portion 24 respectively and by an elongated inclined or angulated portion 30 which extends between the inner ends of the offset portions 22 and 24. The axle 16 is of unitary construction and may be formed in the shape illustrated by conventional manufacturing techniques. Also, each end portion 18 and 20 of the axle 16 is provided with a diametrically extending bore 32 with each bore receiving a pin 34 extending therethrough with the pin being longer than the bore 32 and being rigidly secured thereto with the pin preferably being a "roll pin" which is in the form of a slit tubular member which will frictionally retain itself in the bore 32.

Each of the wheels 12 and 14 includes a peripheral tire 36 of conventional construction and a disc type hub portions 38 or the hub portion may be provided with wire spokes or the like. The hub portion 38 includes a passageway 40 extending therethrough for closely receiving the end portions 18 or 20 of the axle for rotatably journalling the wheels in relation to the axle. The outer surface of the hub 38 is provided with a plurality of circumferentially arranged ratchet teeth 42 which are symetrically oriented about the center of the wheel and include a surface 44 paralleling the axis of rotation of the wheel and an inclined surface 46 with the ratchet teeth 42 being of conventional construction.

Slidably mounted on each of the end portions 18 and 20 is a ratchet sleeve 48 having a bore 50 therethrough enabling the sleeve 48 to slide axially in relation to the axle. The sleeve 48 includes a transverse notch or slot 52 communicating with the outer end thereof and of a size to receive the end portions of the pin 34 with the notch or slots 52 enabling the sleeve 48 to slide axially in relation to the ends of the pin 34. A laterally extending projection 54 is rigid with the periphery of the sleeve 48 and extends axially beyond the end face of the sleeve 48 as indicated by numeral 56 which is in the form of a pawl or tooth having flat and inclined surfaces opposite to the teeth 42 for co-action therewith to either drivingly engage one of the teeth 42 or ratchet past the teeth 42. In order to spring bias the ratchet sleeve 48 towards the wheel, a coil compression spring 58 is positioned around the end portion of the axle and in engagement with the slotted end of the sleeve 48 with the opposite end of the spring being received in a cap 60 whch has an inner enlarged end 62 engaging the hub 38 outwardly of the ratchet teeth 42 to protect the teeth and maintain lubricant therein. The other end of the cap 60 is received on the end portion of the axle and a retaining cap 63 is attached to the end portion 18 or 20 of the axle 16 by either a driving frictional engagement, locked screw threaded engagement or by any other secure fastening means which can be removed when desired but which will retain the components of the wheel and ratchet assembly on the axle.

In order to facilitate use of the device, a pair of elongated boards 64 and 66 are mounted on the respective offset portions 22 and 24 with each board forming a pedal-like structure and provided with a generally elongated planar upper surface which is disposed above the offset portion 22. The lower surface of each of the boards 64 and 66 is provided with a transverse semicylindrical groove 68 which fits down over the respective offset portion 22 or 24 and a retaining plate 70 underlies the groove 68 and is provided with a corresponding groove 72 to engage the opposite surface of the offset portion of the axle with fasteners 74 securing the retaining plate or bottom plate 70 to the board thereby forming a rotatable connection between the respective boards 64 and 66 and offset portions 22 and 24. As illustrated, the boards 64 and 66 are unbalanced longitudinally with respect to the groove 68 so that each of the boards has a longer portion to one side of the offset portions 22 and 24 and each end of the boards may be tapered as at 76 and 78. This enables the longer end portion of the boards 64 and 66 to incline downwardly and actually contact the supporting surface when no one is occupying the boards which facilitates the occupant or user placing his feet on the boards and also this elongated end portion of the board may serve as a brake by dragging along a ground surface in the event the device is used as a coaster downhill in order to control the speed and also in order to directionally control the device when used as a coaster by selectively applying more or less downward pressure to the rearend portion of one or the other of the boards. The device may be propelled in a forward direction by the occupant balancing himself on the boards and moving his feet and weight in a manner to cause the boards and offset portions to move in a circular path about the axis of the end portions of the axle. The ratchet arrangements will drivingly connect the axle to the wheels in one direction of rotation and permit free reverse rotation of the axle in relation to the wheels. Thus, by the occupant shifting his weight or moving his feet in a twisting motion about generally a vertical axis, the device can be directionally controlled when being pedaled or driven forwardly. Thus, the device may be propelled along a supporting surface or used as a coaster when going downhill with the occupant maintaining his balance while pedaling or coasting and being able to effectively directionally control the device when pedaling or when coasting.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wheeled device comprising two parallel, spaced and aligned wheels, an axle interconnecting said wheels, said axle including a pair of opposed offset portions oriented between axially aligned end portions, and one-way drive connecting means between each of the wheels and the end portions of the axle, an elongated pedal rotatably connected to each of the offset portions of the axle to facilitate an occupant or user balancing himself while moving the offset portions in a circular path to propel the device across a supporting surface said one-way drive connecting means including an axially oriented ratchet mechanism associated with each of the wheels and the corresponding end portion of the axle, each ratchet mechanism including a plurality of ratchet teeth circumferentially arranged on the wheel and facing axially therefrom, a sleeve axially slidable on the axle and spring biased toward the wheel, a pin and slot driving connection between the sleeve and the axle, and a ratchet pawl extending axially from the sleeve for engagement with the teeth on the wheel, wherein said pedals are substantially planar and define forward and rearward end portions relative to the offset portions of said axle, said rearward end portion being substantially longer than said forward end portion and having a transverse end edge for frictionally engaging the supporting surface to provide a drag brake when in contact with the supporting surface, thereby enabling steering control of the device by controlling the downward force exerted on the rearward end portion of each pedal.

2. The structure as defined in claim 1 wherein said ratchet teeth on the wheel face axially outwardly of the wheel, said sleeve and pin-and-slot connection between the axle and sleeve being oriented axially outwardly of the wheel, and a hub cap mounted on the axle outwardly of the wheel and including an inner end engaging the wheel circumferentially of the ratchet teeth whereby the hub cap encloses and conceals the ratchet mechanism.

3. The structure as defined in claim 2 wherein a coil compression spring is interposed between the outer end of the sleeve and the hub cap to spring-bias the sleeve inwardly toward the wheel for maintaining the pawl in engagement with the ratchet teeth on the wheel.

* * * * *